(12) United States Patent
Bali et al.

(10) Patent No.: US 8,483,064 B2
(45) Date of Patent: *Jul. 9, 2013

(54) METHOD AND SYSTEM FOR THE DISTRIBUTION OF INTERNET PROTOCOL TRAFFIC IN A COMMUNICATION SYSTEM

(75) Inventors: Soshant Bali, Menlo Park, CA (US); Pradeep K. Kondamuri, Foster City, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 231 days.

This patent is subject to a terminal disclaimer.

(21) Appl. No.: 13/108,773

(22) Filed: May 16, 2011

(65) Prior Publication Data

US 2011/0216665 A1    Sep. 8, 2011

Related U.S. Application Data

(63) Continuation of application No. 12/173,205, filed on Jul. 15, 2008, now Pat. No. 7,974,205.

(51) Int. Cl.
*G06F 11/00* (2006.01)

(52) U.S. Cl.
USPC ...... 370/235; 370/253; 370/395.22; 455/453; 709/233; 711/153; 711/162; 711/216

(58) Field of Classification Search
USPC ..... 370/235, 253, 392, 395.32, 401; 455/453; 709/233; 711/216; 713/153, 162
See application file for complete search history.

(56) References Cited

U.S. PATENT DOCUMENTS

| | | | |
|---|---|---|---|
| 6,768,716 B1 * | 7/2004 | Abel et al. | 370/230 |
| 6,775,280 B1 * | 8/2004 | Ma et al. | 370/392 |
| 6,778,495 B1 * | 8/2004 | Blair | 370/230 |
| 6,888,797 B1 * | 5/2005 | Cao et al. | 370/235 |
| 7,974,205 B1 * | 7/2011 | Bali et al. | 370/235 |
| 2008/0298236 A1 * | 12/2008 | Ervin et al. | 370/232 |

OTHER PUBLICATIONS

Hardy et al., Utilization, May 19, 2007, Wikipedia.*

* cited by examiner

*Primary Examiner* — Hoon J Chung

(57) ABSTRACT

A method for operating a communication system is provided. The method includes receiving an arrival rate of a plurality of real-time packets, and receiving a real-time packet including a first plurality of identifiers, for transmission on a first link or a second link, where the first link has a first bandwidth. The method also includes processing the real-time packet to select a first selected link from the first link and the second link based on the first plurality of identifiers, the arrival rate of the plurality of real-time packets, and the first bandwidth, and transmitting the real-time packet on the first selected link.

14 Claims, 9 Drawing Sheets

METHOD AND SYSTEM FOR THE DISTRIBUTION OF INTERNET PROTOCOL TRAFFIC IN A COMMUNICATION SYSTEM

RELATED APPLICATIONS

This application is a continuation of and claims priority to U.S. patent application Ser. No. 12/173,205, entitled METHOD AND SYSTEM FOR THE DISTRIBUTION OF INTERNET PROTOCOL TRAFFIC IN A COMMUNICATION SYSTEM, filed on Jul. 15, 2008, and which is hereby incorporated by reference in its entirety.

TECHNICAL BACKGROUND

Legacy wireless communication networks are primarily voice-centric networks. These networks also often include traditional backhaul networks using dedicated T-1 lines. These dedicated T-1 backhaul lines are expensive to own and operate. Also, these T-1 lines are based on time-division multiplexing (TDM) technology with low bandwidth, but also with low, fixed latency as is desirable for voice traffic.

Modern wireless communication networks are data-centric networks and are moving towards an Internet Protocol (IP) based architecture. Third generation access technologies such as WiMax (Worldwide Interoperability for Microwave Access) and LTE (Long Term Evolution) support higher bandwidths, enabling new bandwidth intensive applications. This results in a need for higher capacity in the system's backhaul network. Since T-1 lines are expensive and also not optimized for IP-based networks, simply purchasing or leasing more T-1 lines is not a preferred solution to increasing bandwidth needs.

Overview

A method for operating a communication system is provided. The method includes receiving an arrival rate of a plurality of real-time packets, and receiving a real-time packet including a first plurality of identifiers, for transmission on a first link or a second link, where the first link has a first bandwidth. The method also includes processing the real-time packet to select a first selected link from the first link and the second link based on the first plurality of identifiers, the arrival rate of the plurality of real-time packets, and the first bandwidth, and transmitting the real-time packet on the first selected link.

A communication system comprising an interface and a processing system is provided. The interface is configured to receive an arrival rate of a plurality of real-time packets, and to receive a real-time packet including a first plurality of identifiers for transmission on a first link or a second link, where the first link has a first bandwidth. The processing system is configured to process the real-time packet to select a first selected link from the first link and the second link based on the first plurality of identifiers, the arrival rate of the plurality of real-time packets, and the first bandwidth. The interface is also configured to transmit the real-time packet on the first selected link.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION

Figure 1:
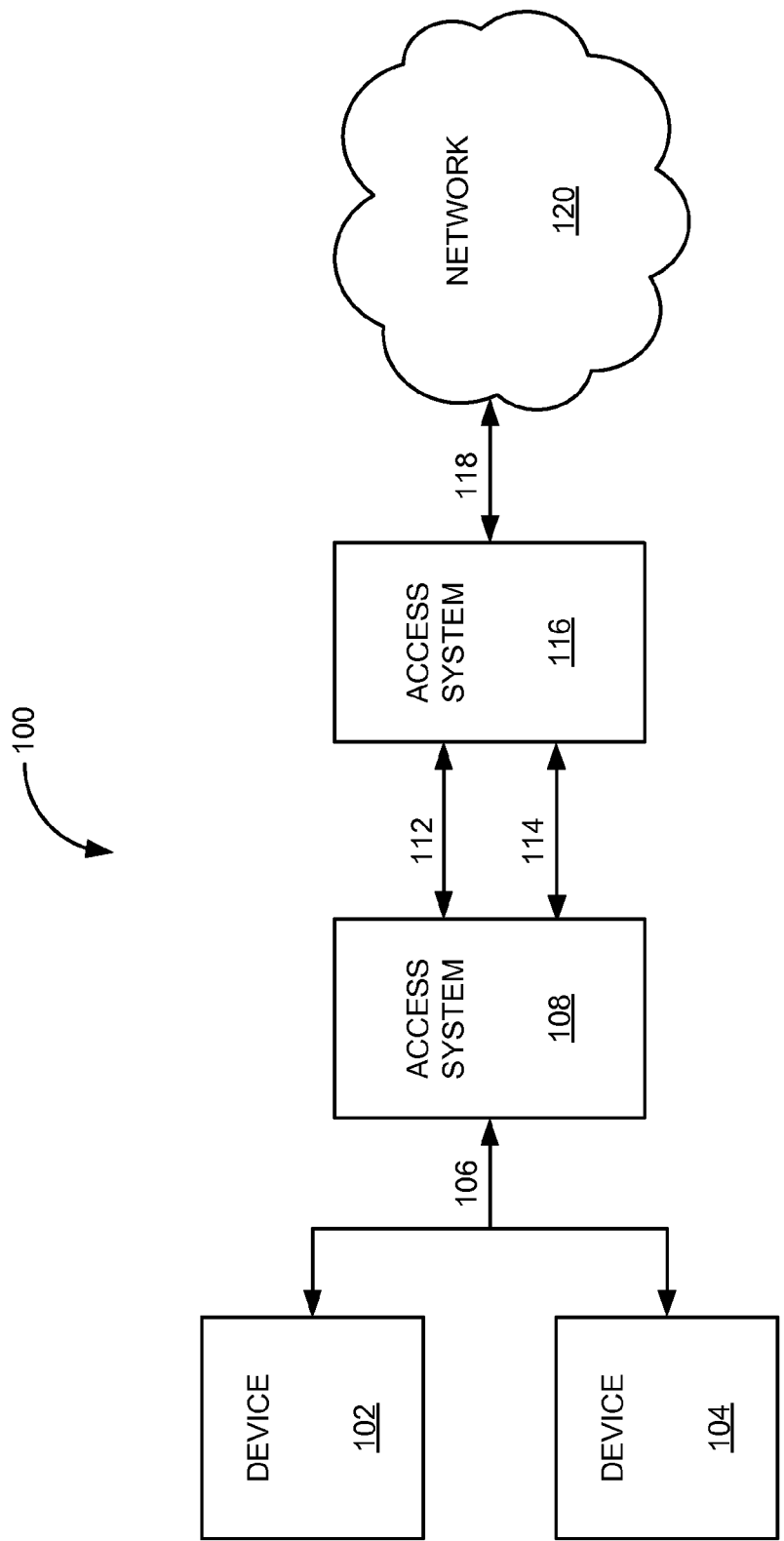
FIG. 1 is a block diagram illustrating a communication system including an access system configured to distribute Internet Protocol traffic in the communication system.

FIG. 1 is a block diagram illustrating a communication system including an access system configured to distribute Internet Protocol traffic in the communication system. In this example embodiment a communication system includes device 102, device 104, access system 108, access system 116, and network 120. Device 102 and device 104 may be any devices capable of communication over communication system 100. For example, they may be cellular phones, computers, ordinary telephones, or the like. Devices 102 and 104 send traffic 106 to access system 108. Traffic 106 may comprise a variety of traffic flows including real-time traffic and non-real-time traffic. Real-time traffic is traffic such as voice data that needs to be sent through network 120 on a real-time basis. Non-real-time traffic is traffic such as data files or electronic documents that may be sent through network 120 with a lower priority on a non-real-time basis. Access system 108 may be a modem, a base station in a Evolution Data Optimized (EVDO) system, a base station in a Worldwide Interoperability for Microwave Access (WiMax) system, or the like. Access system 116 is coupled with access system 108 through first link 112 and second link 114. Access system 116 is connected to network 120 through link 118. Access system 116 may be an access gateway associated with network 120 or any other such device.

First link 112 and second link 114 may have different properties. For example, first link 112 may be a traditional backhaul link such as a T-1 line with a very low latency, useful for the transmission of real-time traffic such as voice data. Second link 114 may be an alternative backhaul link that has much higher bandwidth than first link 112, but at a cost of higher latency. Such a link would be useful for transmission of large data files that do not require real-time service. Links 112, 114, and 118 may use any of a variety of communication media, such as air, metal, optical fiber, or any other signal propagation path, including combinations thereof. Links 112, 114, and 118 may use any of a variety of communication protocols, such as internet, telephony, optical networking, wireless communication, wireless fidelity, code division multiple access, worldwide interoperability for microwave access, or any other communication protocols and formats, including combinations thereof. Links 112, 114, and 118 could be direct links or they might include various intermediate components, systems, and networks.

Access system 108 receives a plurality of traffic 106 from a variety of devices 102 and 104. While traffic 106 is illustrated for simplicity as a single input into access system 108, other embodiments of access system 108 may include any number of input ports, each connected to any number of devices. Access system 108 is also configured to differentiate between real-time traffic and non-real-time traffic and direct various traffic flows to network 120 through first link 112 and second link 114 based on a number of factors described in detail below.

While the example embodiment discussed above illustrates traffic flowing from devices 102 and 104 through links 112 and 114 to network 120, links 112 and 114 may be configured to be bi-directional. These bi-directional links may be used in an example embodiment to direct real-time and non-real-time traffic flows from network 120 through first link 112 and second link 114 to devices 102 and 104 in a similar manner to that described above. In such an embodiment, access system 116 is configured to differentiate between real-time traffic and non-real-time traffic and direct various traffic flows from network 120 through first link 112, second link 114, and access system 108 to devices 102 and 104 based on a number of factors described in detail below. As discussed above, links 112 and 114 may include any number and type of communication media, use any type of communication protocol, and include any number of intermediate components.

Figure 2:
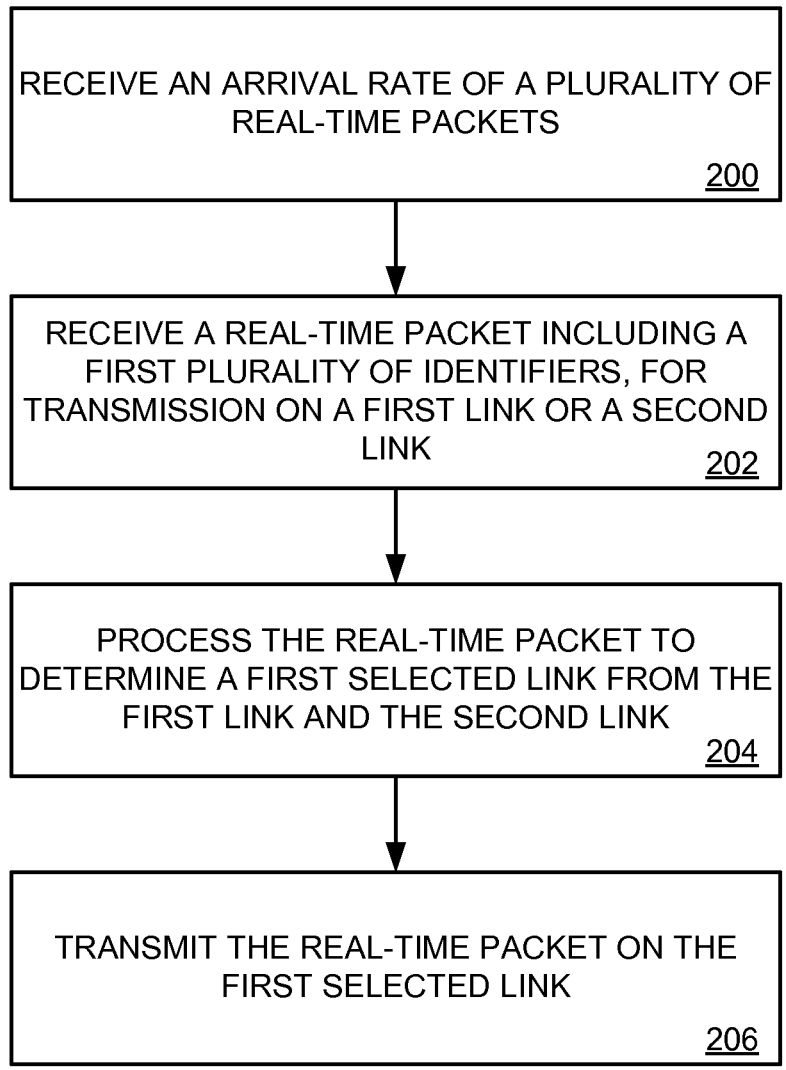
FIG. 2 is a flow chart illustrating a method for the distribution of Internet Protocol traffic in a communication system.

FIG. 2 is a flow chart illustrating a method for the distribution of Internet Protocol traffic in a communication system. Access system 108 receives an arrival rate of a plurality of real-time packets (operation 200). This arrival rate may be determined external to access system 108 and a value transmitted to access system 108, or in other embodiments, access system 108 may monitor the real-time packets arriving and determine this access rate itself.

Access system 108 receives a real-time packet including a first plurality of identifiers for transmission on first link 112 or second link 114 to network 120 (operation 202). This first plurality of identifiers may include identifiers such as a source address, destination address, source port, destination port, and the like. First link 112 has a first bandwidth which is used in processing to determine the link chosen for routing the real-time packet to network 120.

Access system 108 processes the real-time packet to determine a first selected link from the first link 112 and the second link 114 (operation 204). This processing is based on the first plurality of identifiers, the arrival rate of the plurality of real-time packets, and the first bandwidth.

Once access system 108 has determined the first selected link from the first link 112 and the second link 114 it transmits the real-time packet on the first selected link (operation 206). The real-time packet flows through the first selected link to network 120 and on to its final destination.

The method for the distribution of Internet Protocol traffic in a communication system illustrated in FIG. 2 also applies to access system 116 receiving traffic from network 120 and passing the traffic through first link 112 and second link 114 to devices 102 and 104. In such an embodiment, access system 116 receives an arrival rate of a plurality of real-time packets (operation 200). This arrival rate may be determined external to access system 116 and a value transmitted to access system 116, or in other embodiments, access system 116 may monitor the real-time packets arriving and determine this access rate itself.

Access system 116 receives a real-time packet including a first plurality of identifiers for transmission on first link 112 or second link 114 from network 120 to devices 102 and 104 (operation 202). This first plurality of identifiers may include identifiers such as a source address, destination address, source port, destination port, and the like. First link 112 has a first bandwidth which is used in processing to determine the link chosen for routing the real-time packet to devices 102 and 104.

Access system 116 processes the real-time packet to determine a first selected link from the first link 112 and the second link 114 (operation 204). This processing is based on the first plurality of identifiers, the arrival rate of the plurality of real-time packets, and the first bandwidth.

Once access system 116 has determined the first selected link from the first link 112 and the second link 114 it transmits the real-time packet on the first selected link (operation 206). The real-time packet flows through the first selected link to access system 108 and on to its final destination.

Figure 3:
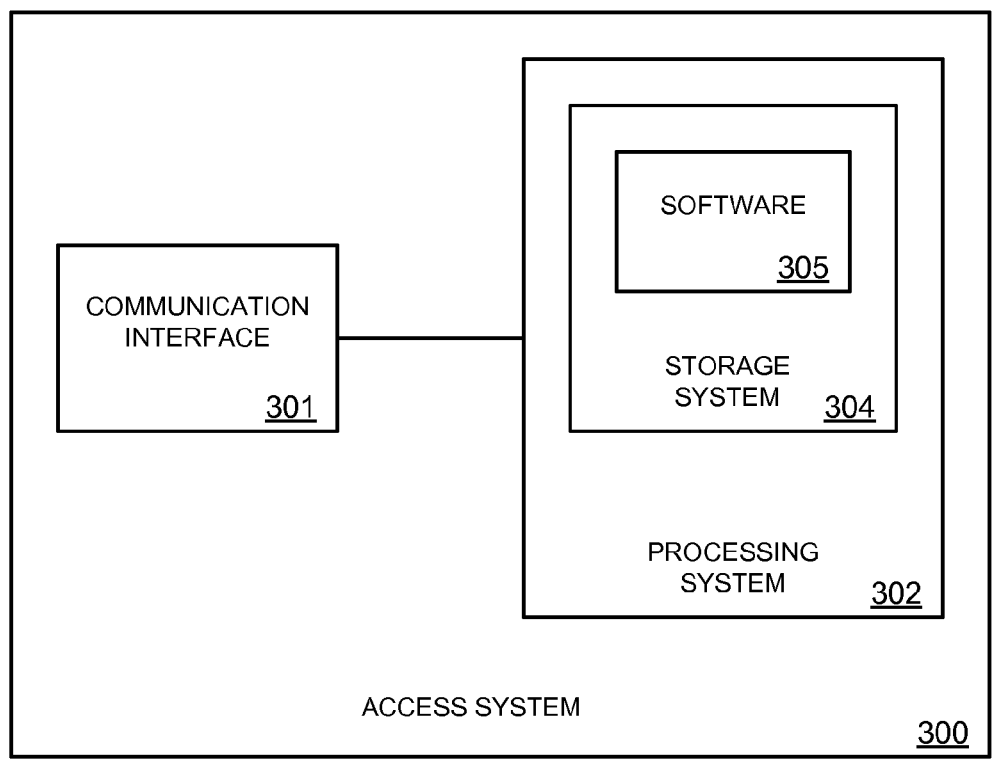
FIG. 3 is a block diagram illustrating an access system configured for the distribution of Internet Protocol traffic in a communication system.

FIG. 3 is a block diagram illustrating an access system configured for the distribution of Internet Protocol traffic in a communication system. Access system 300 includes communication interface 301 and processing system 302. Access system 300 illustrated in FIG. 3 is representative of either access system 108 or access system 116 from FIG. 1. Processing system 302 includes storage system 304. Storage system 304 stores software 305. Processing system 302 is linked to communication interface 301. Access system 300 could be comprised of a programmed general-purpose computer, although those skilled in the art will appreciate that programmable or special purpose circuitry and equipment, such as an Application Specific Integrated Circuit (ASIC), may be used. Access system 300 may be distributed among multiple devices that together comprise elements 301-305.

Communication interface 301 could comprise a network interface, modem, port, transceiver, or some other communication device. Communication interface 301 may be distributed among multiple communication devices. Processing system 302 could comprise a computer microprocessor, logic circuit, or some other processing device. Processing system 302 may be distributed among multiple processing devices. Storage system 304 could comprise a disk, tape, integrated circuit, server, or some other memory device. Storage system 304 may be distributed among multiple memory devices.

Processing system 302 retrieves and executes software 305 from storage system 304. Software 305 may comprise an operating system, utilities, drivers, networking software, and other software typically loaded onto a computer system. Software 305 could comprise an application program, firmware, or some other form of machine-readable processing instructions. When executed by processing system 302, software 305 directs processing system 302 to operate as described herein.

In an example, communication interface 301 receives traffic 106 from device 102 and device 104. Communication interface 301 then transfers internet protocol traffic to network 120 through first link 112 and second link 114. Processing system 302 controls the operation of communication interface 301 and determines which packets of internet protocol traffic are transferred over first link 112 and second link 114 to network 120.

In another example, communication interface 301 receives traffic 118 from network 120. Communication interface 301 then transfers internet protocol traffic to access system 108 through first link 112 and second link 114. Processing system 302 controls the operation of communication interface 301 and determines which packets of internet protocol traffic are transferred over first link 112 and second link 114 to access system 108 and on to devices 102 and 104.

Figure 4:
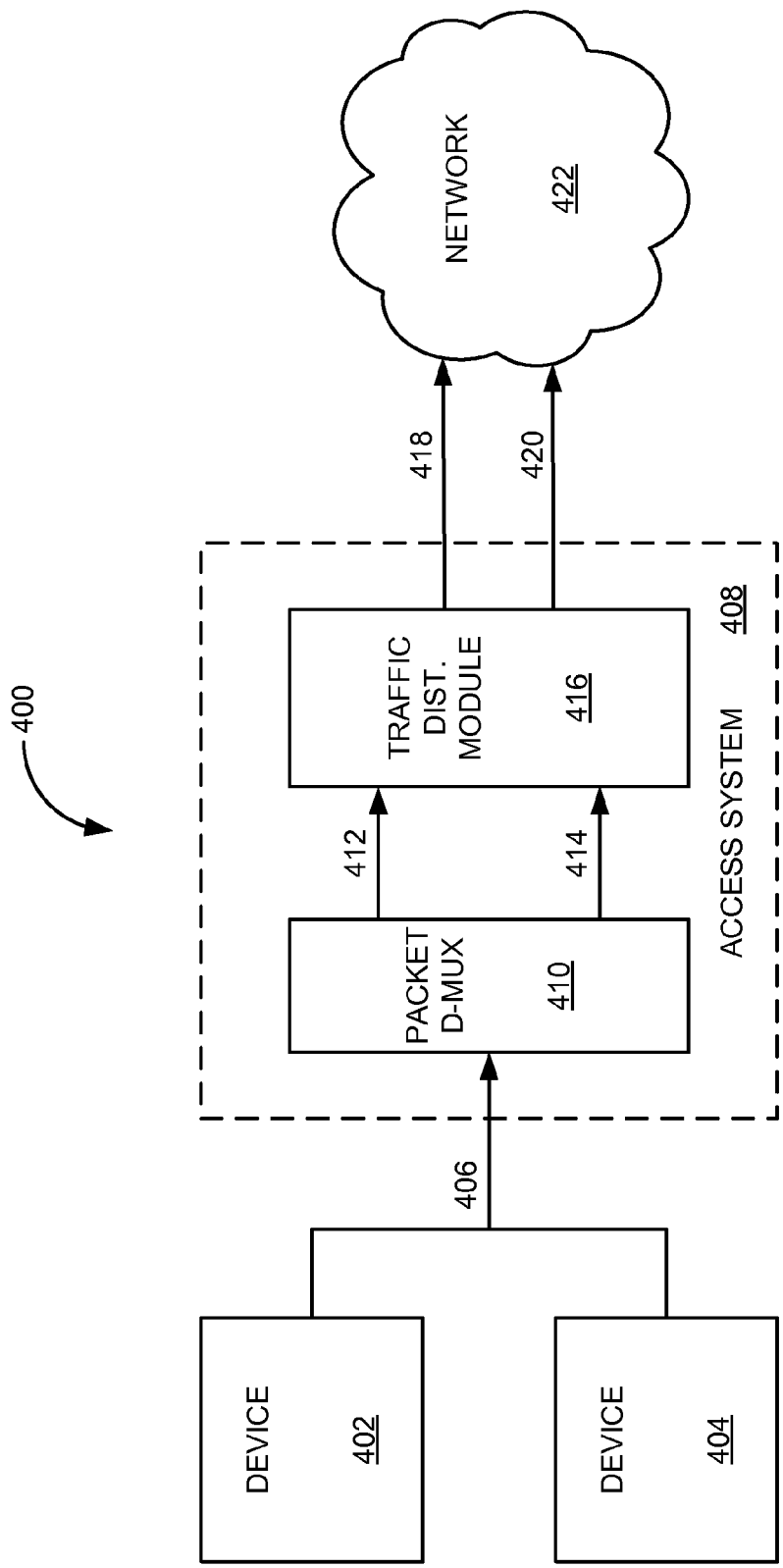
FIG. 4 is a block diagram illustrating a communication system including an access system configured to distribute Internet Protocol traffic in the communication system.
Figure 5:
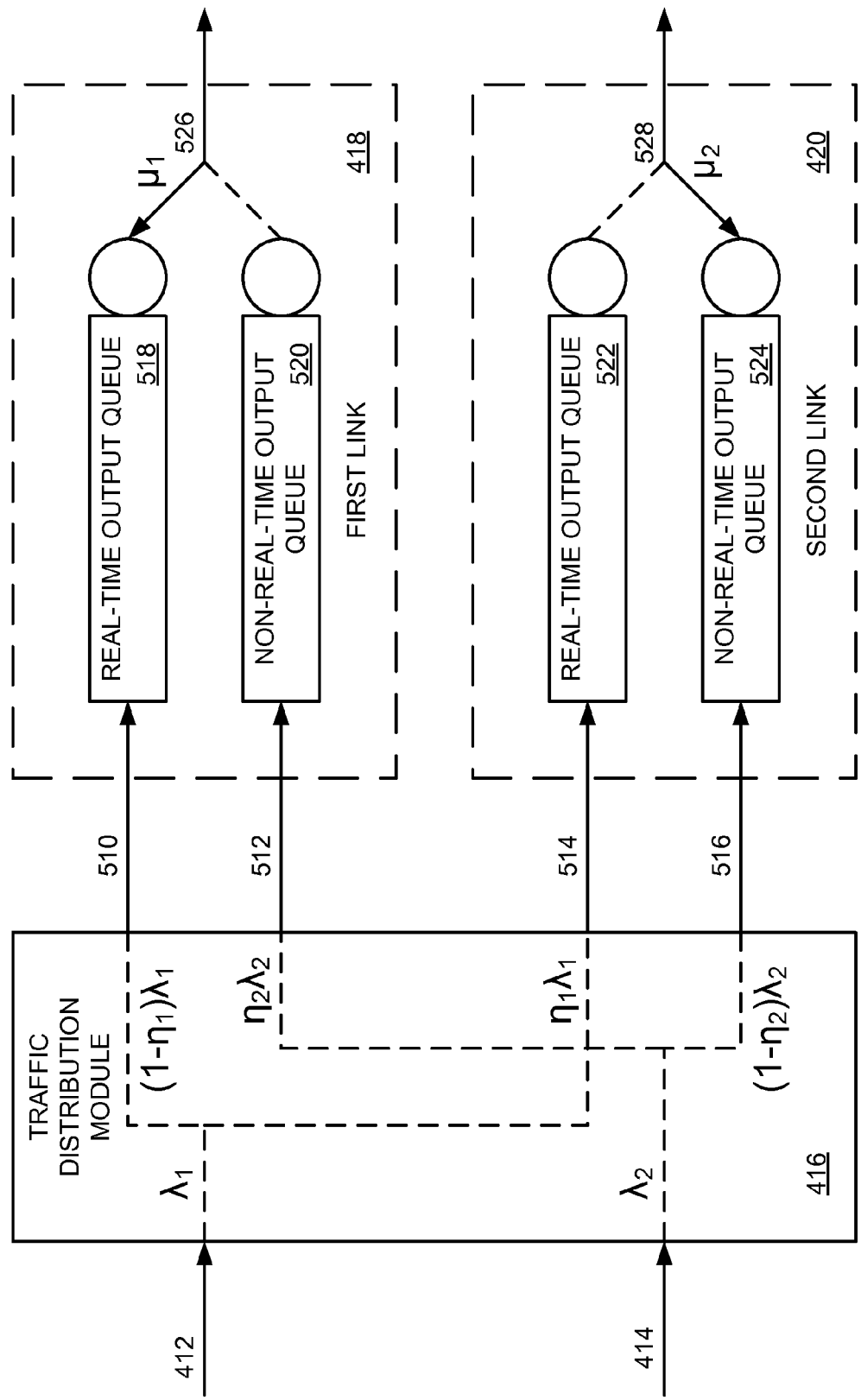
FIG. 5 is a block diagram illustrating a communication system including a traffic distribution module configured to distribute Internet Protocol traffic in the communication system.

FIG. 4 is a block diagram illustrating a communication system including an access system configured to distribute Internet Protocol traffic in the communication system. In this example embodiment, communication system 400 includes device 402, device 404, access system 408 and network 422. Access system 408 includes a packet de-multiplexor 410 and a traffic distribution module 416. Traffic distribution module 416 is illustrated in FIG. 5 and described in further detail below.

Device 402 and device 404 transmit real-time and non-real-time traffic to access system 408 over link 406. Access system 408 receives the real-time and non-real-time traffic over link 406, processes the traffic, and sends the various traffic flows to network 422 over first link 418 and second link 420. In this example, access system 408 includes packet de-multiplexor 410 which receives both real-time and non-real-time traffic over link 406. Packet de-multiplexor 410 then transmits real-time traffic over link 412, and non-real-time traffic over link 414, to traffic distribution module 416.

Traffic distribution module 416 receives real-time traffic over link 412 and non-real-time traffic over link 414 and then sends the various traffic flows to network 422 over first link 418 or second link 420. Circuitry to process the traffic and determine which link to use may reside within access system 408 or traffic distribution module 416, or in any other processor within communication system 400.

In an example embodiment, first link 418 may be a link such as a T-1 line with a very low latency, useful for the transmission of real-time traffic such as voice data. Second link 420 may be a link that has much higher bandwidth than first link 418, but at a cost of higher latency. Such a link would be useful for transmission of large data files that do not require real-time service.

While FIG. 4 illustrates an embodiment having a single access system 408, other embodiments may include an additional access system (not shown) within network 422 configured to direct traffic from network 422 to devices 402 and 404 through first link 418 and second link 420. The methods illustrated in FIGS. 6 through 9 may also apply to this additional access system as well.

FIG. 5 is a block diagram illustrating communication system 400 including traffic distribution module 416 configured to distribute Internet Protocol traffic in the communication system. In this example embodiment, traffic distribution module 416 receives real-time traffic over link 412 and non-real-time traffic over link 414. Traffic distribution module 416 is connected to first link 418 by line 510 and line 512. Traffic distribution module 416 is connected to second link 420 by line 514 and line 516. Real-time traffic traverses line 510 and line 514 while non-real-time traffic traverses line 512 and line 516.

First link 418 includes real-time output queue 518 connected to line 510, and non-real-time output queue 520 connected to line 512. Second link 420 includes real-time output queue 522 connected to line 514 and non-real-time output queue 524 connected to line 516. Thus, each link includes a real-time output queue and a non-real-time output queue. This allows each link to provide priority service to real-time traffic over non-real-time traffic while providing bandwidth for both real-time and non-real-time traffic. In other words, packets in the non-real-time output queues are serviced only when their respective real-time output queues are empty.

First link 418 has a first bandwidth ($\mu_1$) 526 while second link 420 has a second bandwidth ($\mu_2$) 528. If real-time traffic is received at a rate less than first bandwidth 526 times U (where U is the maximum utilization of first link 418, and may be set automatically or by a user), first link 418 has bandwidth available for use by non-real-time traffic. If real-time traffic is received at a rate greater than first bandwidth 526 times U, some of the real-time traffic will need to be transferred to the network over second link 420. Since traffic is not received at a steady state rate, but may instead be received in bursts, it is preferred that a maximum utilization of first link 418 is set to a value that is a fraction of the first bandwidth (for example, U may be set to 0.8).

In this example embodiment, real-time traffic is received at an arrival rate represented by $\lambda_1$ while non-real-time traffic is received at an arrival rate represented by $\lambda_2$. A fraction of the incoming real-time traffic to be sent over second link 420 is determined by the access system, along with a fraction of the incoming non-real-time traffic to be sent over first link 418. If the fraction of the incoming real-time traffic to be sent over second link 420 is represented by $\eta_1$, then the fraction of the incoming real-time traffic to be sent over first link 418 is represented by $(1-\eta_1)$. If the fraction of the incoming non-real-time traffic to be sent over first link 418 is represented by $\eta_2$, then the fraction of the incoming non-real-time traffic to be sent over second link 420 is represented by $(1-\eta_2)$.

The fraction of the incoming real-time traffic to be sent over second link 420 may be determined as follows:

$$\eta_1 = \begin{cases} 0, & \text{if } \lambda_1 \leq U\mu_1 \\ 1 - \frac{U\mu_1}{\lambda_1}, & \text{otherwise} \end{cases} \quad \text{[Equation 1]}$$

where $\eta_1$ is the fractional value representing the fraction of incoming real-time packets to be sent to second link 420, U is the maximum utilization of the first link, $\mu_1$ is the bandwidth of first link 418, and $\lambda_1$ is the arrival rate of the plurality of real-time packets over link 412.

The fraction of the incoming non-real-time traffic to be sent over first link 418 may be determined as follows:

$$\eta_2 = \begin{cases} \min\left(1, \frac{U\mu_1 - \lambda_1}{\lambda_2}\right), & \text{if } \lambda_1 \leq U\mu_1 \\ 0, & \text{otherwise} \end{cases} \quad \text{[Equation 2]}$$

where $\eta_2$ is the fraction of incoming non-real-time packets to be sent to first link 418, U is the maximum utilization of first link 418, $\mu_1$ is the bandwidth of first link 418, $\lambda_1$ is the arrival rate of the plurality of real-time packets over link 412, and $\lambda_2$ is the arrival rate of the plurality of non-real-time packets over link 414.

Figure 6:
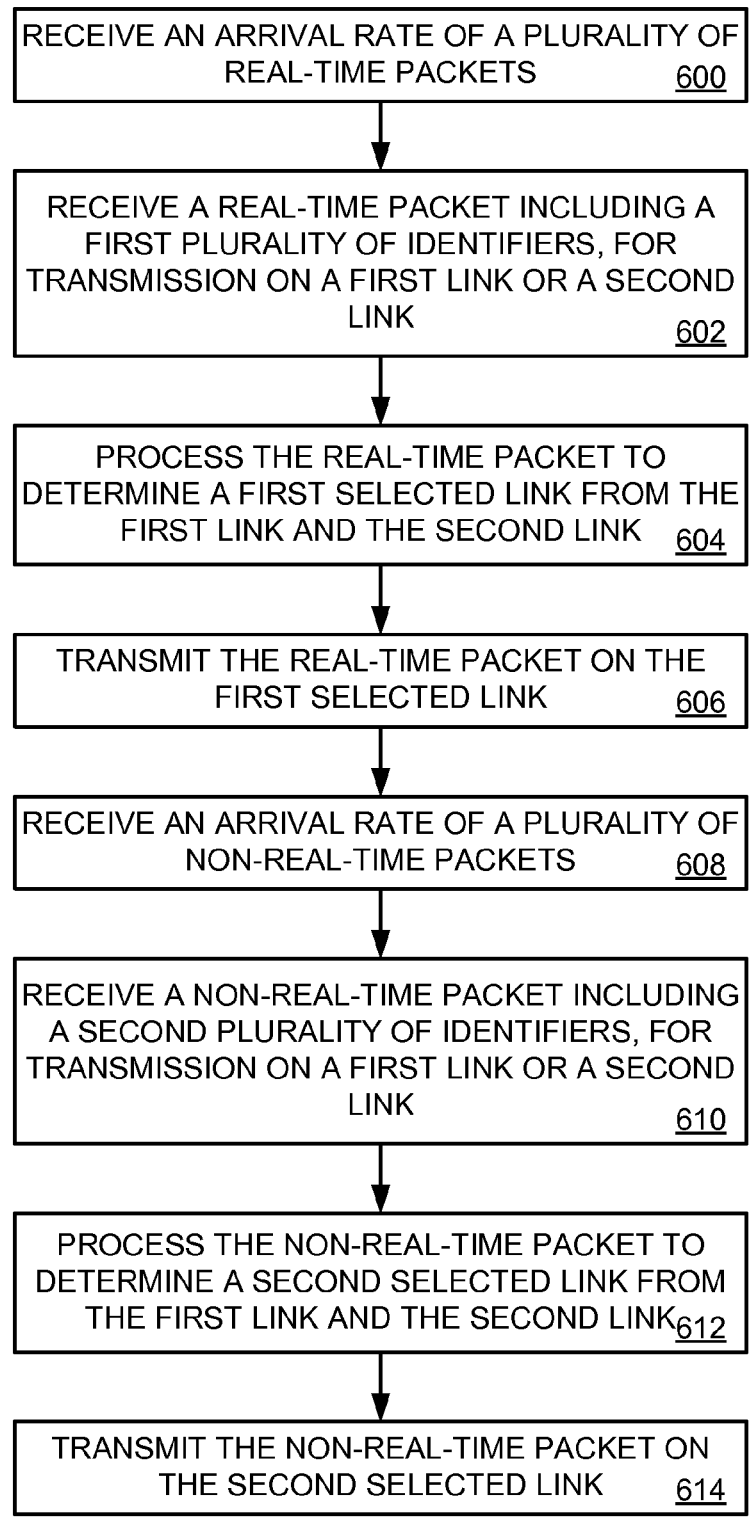
FIG. 6 is a flow chart illustrating a method for the distribution of Internet Protocol traffic in a communication system.

FIG. 6 is a flow chart illustrating a method for the distribution of Internet Protocol traffic in communication system 400. Access system 408 receives an arrival rate of a plurality of real-time packets (operation 600). This arrival rate may be determined external to access system 408 and a value transmitted to access system 408, or in other embodiments, access system 408 may monitor the real-time packets arriving and determine this access rate itself.

Access system 408 receives a real-time packet including a first plurality of identifiers for transmission on a first link 418 or a second link 420 to network 422 (operation 602). This first plurality of identifiers may include identifiers such as a source address, destination address, source port, destination port, and the like. First link 418 has a first bandwidth which is used in processing to determine the link chosen for the real-time packet.

Figure 7:
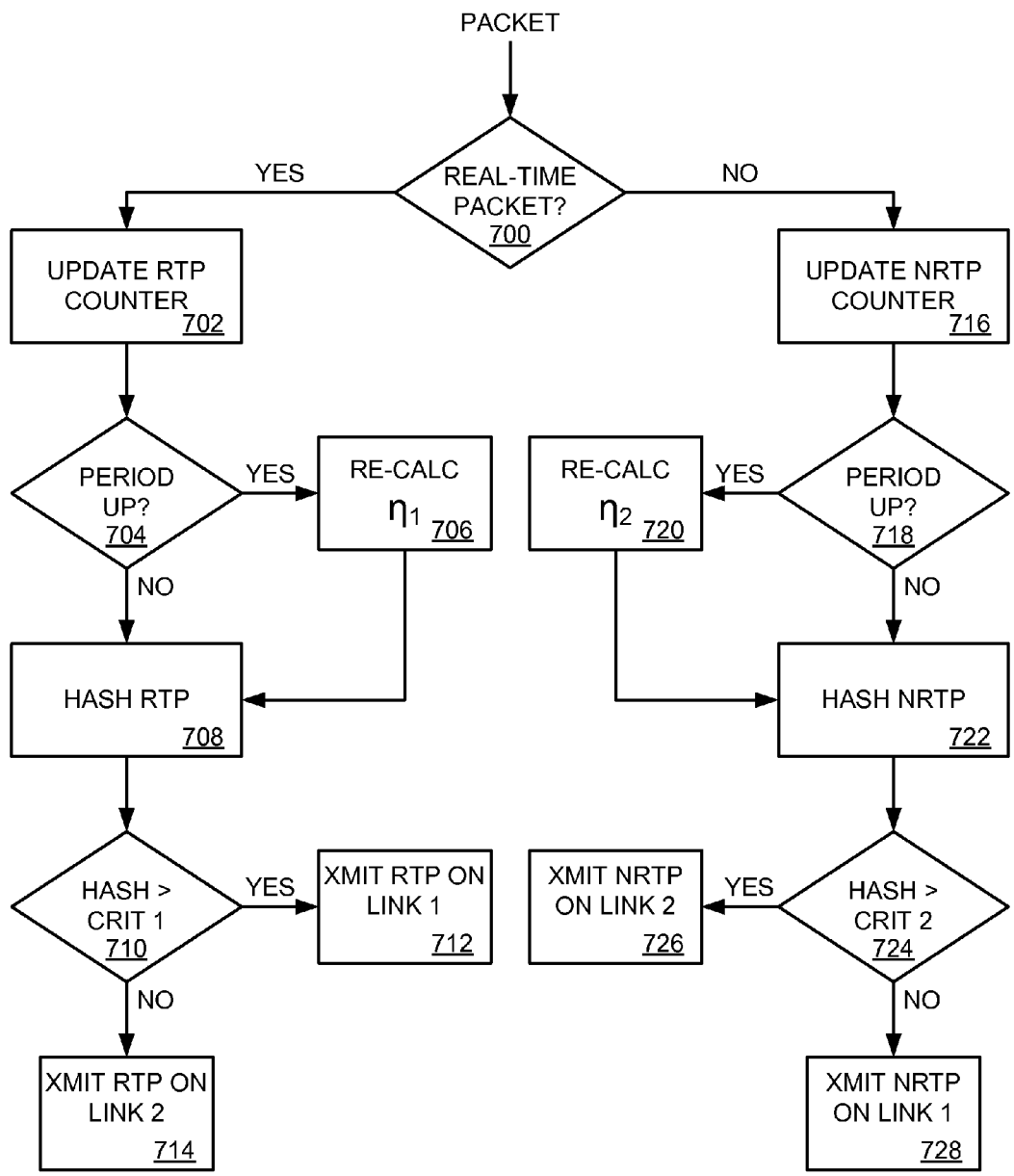
FIG. 7 is a flow chart illustrating a method for the distribution of Internet Protocol traffic in a communication system.

Access system 408 processes the real-time packet to determine a first selected link from the first link 418 and the second link 420 (operation 604). This processing is based on the first plurality of identifiers, the arrival rate of the plurality of real-time packets, and the first bandwidth. Further details of this operation are illustrated in FIG. 7 and described below.

Once access system 408 has determined the first selected link from the first link 418 and the second link 420 it transmits the real-time packet on the first selected link (operation 606). The real-time packet passes through the first selected link to network 422 and on to its final destination.

Access system 408 receives an arrival rate of a plurality of non-real-time packets (operation 608). This arrival rate may be determined external to access system 408 and a value transmitted to access system 408, or in other embodiments, access system 408 may monitor the non-real-time packets arriving and determine this access rate itself.

Access system 408 receives a non-real-time packet including a second plurality of identifiers for transmission on a first link 418 or a second link 420 to network 422 (operation 610). This second plurality of identifiers may include identifiers such as a source address, destination address, source port, destination port, and the like.

Access system 408 processes the non-real-time packet to determine a second selected link from the first link 418 and the second link 420 (operation 612). This processing is based on the second plurality of identifiers, the arrival rate of the plurality of real-time packets, and the first bandwidth. Further details of this operation are illustrated in FIG. 7 and described below.

Once access system 408 has determined the second selected link from the first link 418 and the second link 420 it transmits the non-real-time packet on the second selected link (operation 614). The non-real-time packet passes through the second selected link to network 422 and on to its final destination.

Other embodiments of the method illustrated in FIG. 6 may operate on an additional access system (not shown) within network 422 configured to direct traffic from network 422 to devices 402 and 404 through first link 418 and second link 420. This additional access system acts to direct traffic through first link 418 and second link 420 in a reverse direction from that discussed above with respect to access system 408.

FIG. 7 is a flow chart illustrating a method for the distribution of Internet Protocol traffic in communication system 400. Access system 408 receives a packet and examines the packet to determine if it is a real-time packet or a non-real-time packet (operation 700). If the packet is a real-time packet, a real-time packet counter is updated to account for the packet (operation 702). Access system 408 determines if a calculation period is up (operation 704) and recalculates the fractional value representing the fraction of the incoming real-time traffic to be sent over second link 420, represented by $\eta_1$, if the period is up (operation 706). This period may be a length of time, a number of packets received, or any other period capable of triggering an automatic update of the fractional value representing the fraction of the incoming real-time traffic to be sent over second link 420.

Access system 408 then performs a hashing function on one or more of the parameters of the real-time packet (operation 708). These parameters may include a source address, destination address, source port, destination port, or any other parameters related to the real-time packet. The hashing function may be performed in any of a wide variety of methods such as CRC16, checksum, or XOR methods. Hashing is used to ensure that all of the packets in a single traffic flow are passed to network 422 through the same link. This prevents the packets from arriving at their destination out of order.

Access system 408 compares the results of the hashing function (a hash value) to a first criteria (operation 710). If the hash value is greater than the first criteria, the real-time packet is transmitted to network 422 over first link 418. If the hash value is less than the first criteria, the real-time packet is transmitted to network 422 over second link 420. The hashing function and comparison of the hash value to a criteria are further illustrated in FIG. 8 and described in detail below.

If the packet is a non-real-time packet, a non-real-time packet counter is updated to account for the packet (operation 716). Access system 408 determines if a calculation period has expired (operation 718) and recalculates the fractional value representing the fraction of the incoming non-real-time traffic to be sent over first link 418, represented by $\eta_2$, if the period has expired (operation 720). This period may be a length of time, a number of packets received, or any other period capable of triggering an automatic update of the fractional value representing the fraction of the incoming non-real-time traffic to be sent over first link 418.

Access system 408 then performs a hashing function on one or more of the parameters of the non-real-time packet (operation 722). These parameters may include a source address, destination address, source port, destination port, or any other parameters related to the non-real-time packet. The hashing function may be performed in any of a wide variety of methods such as CRC16, checksum, or XOR methods. Hashing is used to ensure that all of the packets in a single traffic flow are passed to network 422 through the same link. This prevents the packets from arriving at their destination out of order.

Access system 408 compares the results of the hashing function (a hash value) to a second criteria (operation 724). If the hash value is greater than the second criteria, the non-real-time packet is transmitted to network 422 over second link 420. If the hash value is less than the second criteria, the non-real-time packet is transmitted to network 422 over first link 418. The hashing function and comparison of the hash value to a criteria are further illustrated in FIG. 8 and described in detail below.

Other embodiments of the method illustrated in FIG. 7 may operate on an additional access system (not shown) within network 422 configured to direct traffic from network 422 to devices 402 and 404 through first link 418 and second link 420. This additional access system acts to direct traffic through first link 418 and second link 420 in a reverse direction from that discussed above with respect to access system 408.

Figure 8:
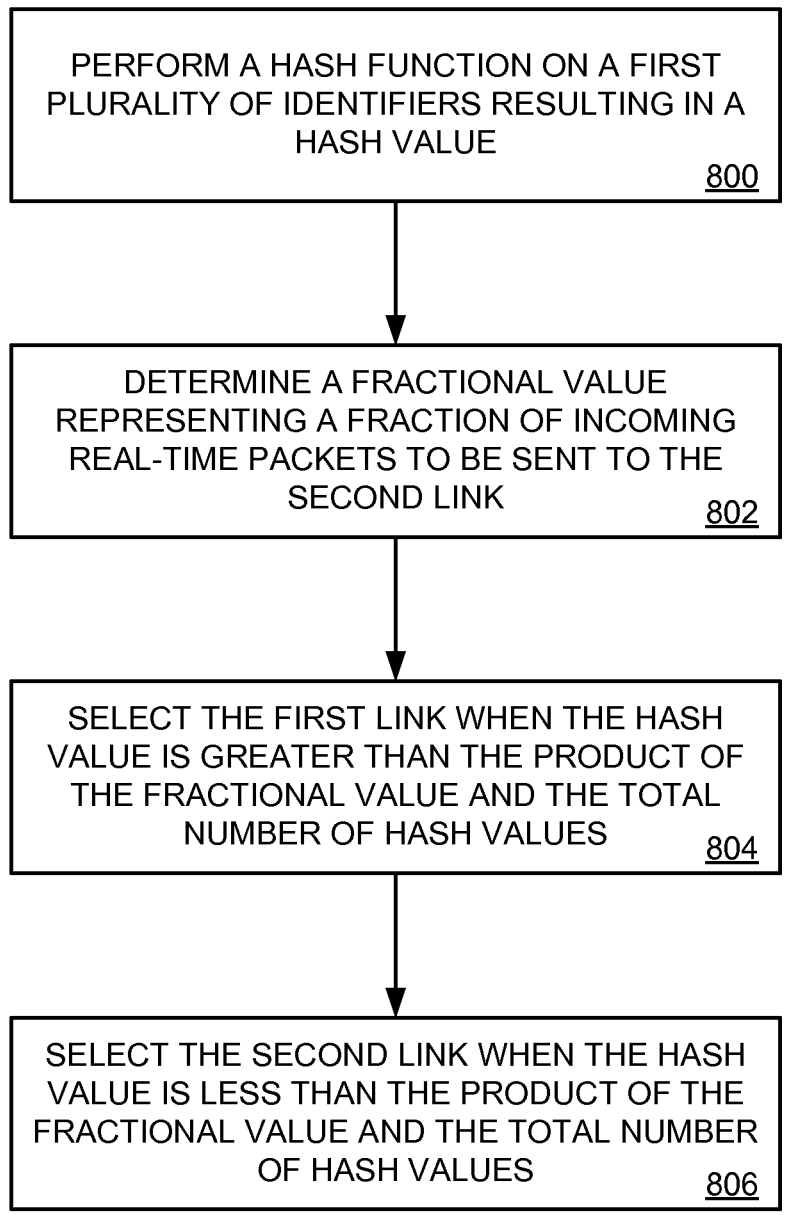
FIG. 8 is a flow chart illustrating a method for the distribution of Internet Protocol traffic in a communication system.

FIG. 8 is a flow chart illustrating a method for the distribution of internet traffic in communication system 400. When a real-time packet is received, access system 408 performs a hash function on a first plurality of identifiers from the real-time packet resulting in a hash value (operation 800). This first plurality of identifiers may include identifiers such as a source address, destination address, source port, destination port, or any other identifiers related to the real-time packet. The hashing function may be performed in any of a wide variety of methods such as CRC16, checksum, or XOR methods. Hashing is used to ensure that all of the packets in a single traffic flow are passed to network 422 through the same link. This prevents the packets from arriving at their destination out of order.

Any hash function selected will have a total number of possible hash values. For example, if a hash function producing a four bit output is selected, the hash function has a total of $2^4$ or 16 possible hash values. Likewise, if a hash function producing an eight bit output is selected, the hash function has a total of $2^8$ or 256 possible hash values.

Access system 408 determines a fractional value representing a fraction of incoming real-time packets to be sent to second link 420 (operation 802). This fractional value may be calculated using Equation 1 as described above.

When the hash value is greater than the product of the fractional value and the total number of hash values, access system 408 selects first link 418 as the first selected link (operation 804). When the hash value is less than the product of the fractional value and the total number of hash values, access system selects second link 420 as the first selected link (operation 806).

Other embodiments of the method illustrated in FIG. 8 may operate on an additional access system (not shown) within network 422 configured to direct traffic from network 422 to devices 402 and 404 through first link 418 and second link 420. This additional access system acts to direct traffic through first link 418 and second link 420 in a reverse direction from that discussed above with respect to access system 408.

Figure 9:
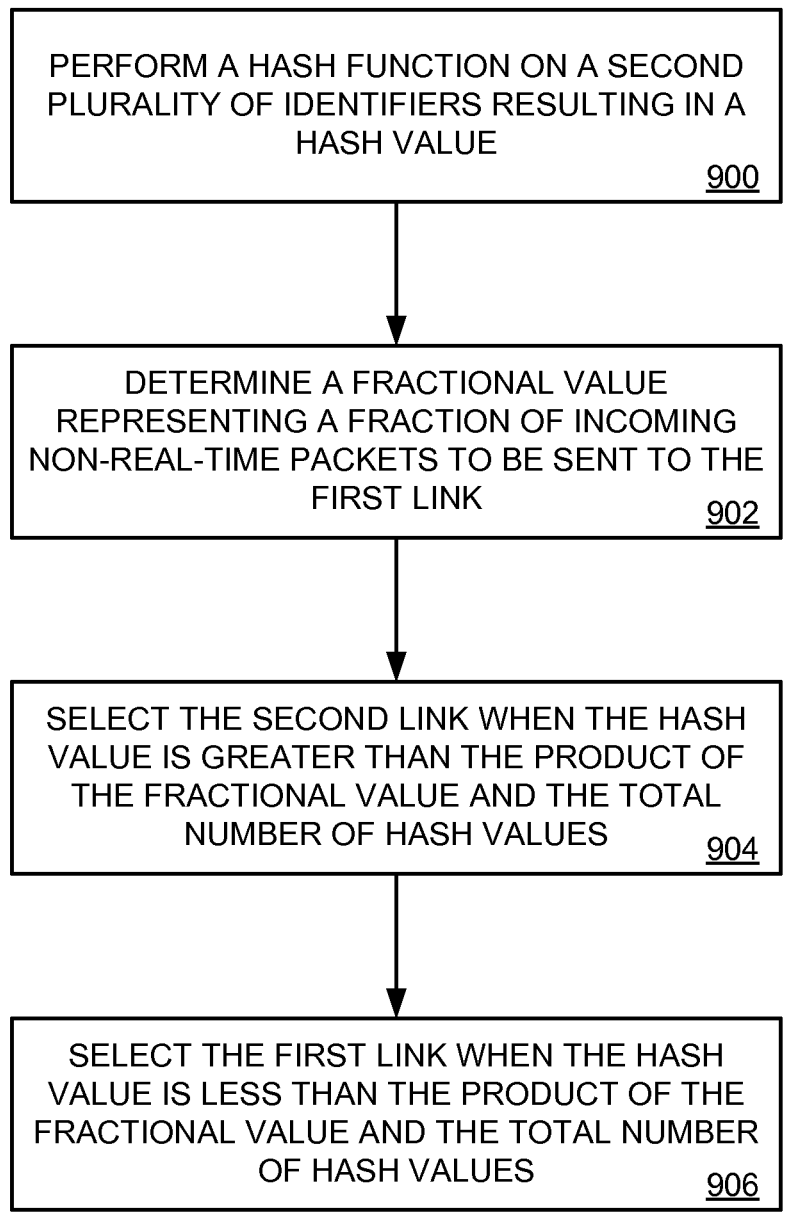
FIG. 9 is a flow chart illustrating a method for the distribution of Internet Protocol traffic in a communication system.

FIG. 9 is a flow chart illustrating a method for the distribution of internet traffic in communication system 400. When a non-real-time packet is received, access system 408 performs a hash function on a second plurality of identifiers from the non-real-time packet resulting in a hash value (operation 900). This second plurality of identifiers may include identifiers such as a source address, destination address, source port, destination port, or any other identifiers related to the real-time packet. The hashing function may be performed in any of a wide variety of methods such as CRC16, checksum, or XOR methods. Hashing is used to ensure that all of the packets in a single traffic flow are passed to network 422 through the same link. This prevents the packets from arriving at their destination out of order.

Any hash function selected will have a total number of possible hash values. For example, if a hash function producing a four bit output is selected, the hash function has a total of $2^4$ or 16 possible hash values. Likewise, if a hash function producing an eight bit output is selected, the hash function has a total of $2^8$ or 256 possible hash values.

Access system 408 determines a fractional value representing a fraction of incoming non-real-time packets to be sent to first link 418 (operation 902). This fractional value may be calculated using Equation 2 as described above.

When the hash value is greater than the product of the fractional value and the total number of hash values, access system 408 selects second link 420 as the second selected link (operation 904). When the hash value is less than the product of the fractional value and the total number of hash values, access system selects first link 418 as the second selected link (operation 906).

Other embodiments of the method illustrated in FIG. 9 may operate on an additional access system (not shown) within network 422 configured to direct traffic from network 422 to devices 402 and 404 through first link 418 and second link 420. This additional access system acts to direct traffic through first link 418 and second link 420 in a reverse direction from that discussed above with respect to access system 408.

Legacy wireless networks have been primarily voice-centric networks. The traditional backhaul network for such access networks has been based on dedicated, but expensive T-1 lines, which are typically leased from incumbent local exchange carriers (ILECs) or local telephone companies, although microwave links are also used in some cases. These T-1 lines are based on time-division multiplexing (TDM) technology with relatively lower bandwidth but with low, fixed latency which is desirable for voice traffic. However, modern networks are data-centric and are moving towards all Internet Protocol (IP) based network architecture.

Modern access technologies like WiMax (Worldwide Interoperability for Microwave Access) and LTE (Long Term Evolution) are able to support higher bandwidths (tens of Mbps) there by enabling new bandwidth-intensive applications which implies need for higher capacity in the backhaul network. Leasing more T-1 lines would not be an affordable, long-term option for carriers and more over T-1 lines are not optimized for IP-based networks. Hence carriers are actively pursuing alternative backhaul networks, primarily Ethernet-based, which are relatively inexpensive and can support higher bandwidths. However, these alternative networks are typically shared networks, unlike T-1 lines, and the latencies are not fixed, which could become an issue for real-time applications if not properly addressed. Moreover, the shared alternative backhaul networks may not have the same high availability characteristics that are typical of T-1 lines. Also, since T-1 lines are leased point-to-point links, these links are typically superior to shared backhaul links from the point of view of network security.

Completely replacing the traditional T-1 networks with alternative backhaul networks would not happen overnight as the carriers would be reluctant to transport commercial traffic over the alternative networks until certain level of confidence is achieved, as this could adversely affect customer satisfaction. This would imply a gradual phase out of T-1 networks and the possibility of the existence of multiple backhaul networks (traditional and alternative) during the transition period. Other scenarios might also exist where the carriers would retain a certain number of T-1 lines along with the alternative backhaul network either due to lease contractual obligations or to ensure performance guarantees. In such scenarios a question arises as to how the traffic could be distributed between the traditional and alternative backhaul networks, taking into account the capabilities and shortcomings of these individual networks and the requirements of the different application flows so as achieve best performance.

In the near future, it is expected that service providers will start offering real-time services, such as VoIP (Voice over Internet Protocol) using IMS (IP Multimedia Subsystem), using the same data networks, such as 1xEVDO (Evolution Data Optimized), WiMax, and LTE (Long Term Evolution) networks that are presently used to offer basic Internet access services. Transporting real-time traffic typically generates more revenue for a service provider than transporting best effort data traffic. If the alternative low-cost links are used to increase backhaul capacity, it is important that the revenue generating real-time traffic is not sent using these alternative backhaul links, but is instead sent using the traditional backhaul link such as T-1, until the service provider has gained enough confidence in these alternative backhaul technologies to transport premium real-time traffic. Low cost alternative backhaul links may exhibit high delays and delay variation, lower availability and security and for this reason, the service providers may not want to send the revenue generating traffic using these alternative backhaul networks.

Given a traditional backhaul link and an alternative backhaul link, the traffic distribution requirements are summarized as follows. First, as much as possible, real-time traffic should be sent using the traditional backhaul link. Second, best effort data traffic should be sent using traditional backhaul link if bandwidth is available on this link and if sending the data traffic on this link does not cause excessive delays for the real-time traffic on this link. Third, the alternative backhaul link should be used to send best effort data traffic only if sending this traffic using the traditional backhaul link causes excessive queuing delays on the traditional backhaul link. Finally, if there is more real-time traffic than can be served using the traditional backhaul link alone then some of this real-time traffic should be sent using the alternative backhaul link.

As with any load balancing algorithm, packets from the same flow should be sent using the same link to avoid packet reordering. Also, the method should have low computational complexity so that it can run at line speed.

It should be emphasized that the above-described embodiments are merely possible examples of implementations, merely set forth for a clear understanding of the principles of this disclosure. Many variations and modifications may be made to the above-described embodiments without departing substantially from the spirit and principles of the disclosure. All such modifications and variations are intended to be included herein within the scope of this disclosure.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for operating a communication system, the method comprising:
   receiving an arrival rate of a plurality of real-time packets;
   receiving a real-time packet including a first plurality of identifiers, for transmission on either a first link or a second link, wherein the first link has a first bandwidth;
   performing a hash function on the first plurality of identifiers resulting in a first hash value, wherein the hash function has a total number of possible hash values;
   determining a fractional value representing a fraction of incoming real-time packets to be sent to the second link based on a comparison of the arrival rate of the plurality of real-time packets to the first bandwidth, and based on a ratio involving the arrival rate of the plurality of real-time packets and the first bandwidth;
   transmitting the real-time packet on the first link when the first hash value is greater than a product of the fractional value and the total number of possible hash values; and
   transmitting the real-time packet on the second link when the first hash value is less than the product of the fractional value and the total number of possible hash values.

2. The method of claim 1, wherein the fractional value is determined at least in part based on a maximum utilization of the first link, the first bandwidth, and the arrival rate of the plurality of real-time packets.

3. The method of claim 1, wherein the arrival rate of the plurality of real-time packets is automatically updated periodically.

4. The method of claim 1, further comprising:
   receiving an arrival rate of a plurality of non-real-time packets;
   receiving a non-real-time packet including a second plurality of identifiers, for transmission on the first link or the second link;
   processing the non-real-time packet to select one of either the first link or the second link based on the second plurality of identifiers, the arrival rate of the plurality of real-time packets, the arrival rate of the plurality of non-real-time packets, and the first bandwidth; and
   transmitting the non-real-time packet on the selected one of the first link or the second link.

5. The method of claim 4, wherein processing the non-real-time packet to select either the first link or the second link based on the second plurality of identifiers, the arrival rate of the plurality of real-time packets, the arrival rate of the plurality of non-real-time packets, and the first bandwidth comprises:
   performing a hash function on the second plurality of identifiers resulting in a second hash value, wherein the hash function has a total number of possible hash values;
   determining a fractional value representing a fraction of incoming non-real-time packets to be sent to the first link based on the first bandwidth, the arrival rate of the plurality of real-time packets, and the arrival rate of the plurality of non-real-time packets;
   selecting the second link when the second hash value is greater than a product of the fractional value and the total number of possible hash values of the second plurality of identifiers; and
   selecting the first link when the second hash value is less than the product of the fractional value and the total number of possible hash values of the second plurality of identifiers.

6. The method of claim 5, wherein determining the fraction of incoming non-real-time packets to be sent to the first link is based on a maximum utilization of the first link, the first bandwidth, the arrival rate of the plurality of real-time packets, and the arrival rate of the plurality of non-real-time packets.

7. The method of claim 6, wherein the second link is selected when the second hash value is greater than the fraction of incoming non-real-time packets to be sent to the first link multiplied by the total number of possible hash values, otherwise the second selected link is the first link.

8. The method of claim 4, wherein the arrival rate of the plurality of non-real-time packets is automatically updated periodically.

9. The method of claim 1, wherein the first link is a traditional backhaul link, and the second link is an alternative backhaul link.

10. A communication system comprising:
    an interface configured to receive an arrival rate of a plurality of real-time packets, and to receive a real-time packet including a first plurality of identifiers for transmission on a first link or a second link, wherein the first link has a first bandwidth; and
    a processing system configured to:
       perform a hash function on the first plurality of identifiers resulting in a first hash value, wherein the hash function has a total number of possible hash values;
       determine a fractional value representing a fraction of incoming real-time packets to be sent to the second link based on the comparison of the arrival rate of the plurality of real-time packets to the first bandwidth, and based on a ratio involving the arrival rate of the plurality of real-time packets and the first bandwidth;
       select the first link when the first hash value is greater than a product of the fractional value and the total number of possible hash values; and select the second link when the first hash value is less than the product of the fractional value and the total number of possible hash values;

wherein the interface is further configured to transmit the real-time packet on the selected one of the first link or second link.

11. The communication system of claim 10, wherein the arrival rate of the plurality of real-time packets is automatically updated periodically.

12. The communication system of claim 10,
wherein the interface is also configured to receive an arrival rate of a plurality of non-real-time packets, and to receive a non-real-time packet including a second plurality of identifiers, for transmission on the first link or the second link;

wherein the processing system is also configured to process the non-real-time packet to select from the first link and the second link based on the second plurality of identifiers, the arrival rate of the plurality of real-time packets, the arrival rate of the plurality of non-real-time packets, and the first bandwidth; and wherein the interface is also configured to transmit the non-real-time packet on the selected one of the first link the second link.

13. The communication system of claim 12, wherein the processing system is also configured to automatically update the arrival rate of the plurality of non-real-time packets periodically.

14. The communication system of claim 10, wherein the first link is a traditional backhaul link, and the second link is an alternative backhaul link.

* * * * *